United States Patent
Myers et al.

(10) Patent No.: US 6,821,492 B1
(45) Date of Patent: Nov. 23, 2004

(54) STRONGER CATALYST USING SELECTIVE WASHCOAT LOCATION

(75) Inventors: Stephen Joe Myers, Owosso, MI (US); Michael Ralph Foster, Columbiaville, MI (US); Fong Z. Li, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 827 days.

(21) Appl. No.: 09/660,715

(22) Filed: Sep. 13, 2000

(51) Int. Cl.[7] .............................. B01D 53/34; F01N 3/28
(52) U.S. Cl. ...................... 422/180; 422/177; 502/439
(58) Field of Search ................................ 422/177, 180, 422/222; 428/116, 593, 594; 502/439

(56) References Cited

U.S. PATENT DOCUMENTS

| | | | | |
|---|---|---|---|---|
| 3,903,341 A | * | 9/1975 | Gerhold ...................... 428/116 |
| 4,294,806 A | * | 10/1981 | Abe et al. ................. 423/239.1 |
| 4,455,336 A | * | 6/1984 | Ogawa et al. .............. 428/116 |
| 5,494,881 A | * | 2/1996 | Machida et al. ............ 502/439 |
| 6,468,484 B1 | | 10/2002 | Dou et al. ................ 423/213.2 |

* cited by examiner

Primary Examiner—Hien Tran
(74) Attorney, Agent, or Firm—Paul L. Marshall

(57) ABSTRACT

A strengthened thin-walled catalytic converter substrate includes thin perimeter walls and thin interior walls defining cells and a catalyst washcoat selectively disposed on the substrate. Washcoat thickness is increased in those cells having the most impact on final catalyst strength, typically the outer cells defined by the perimeter walls. A method for maximizing overall catalyst strength with minimal substrate thermal mass includes selectively applying washcoat based on desired substrate strength and converter assembly method.

7 Claims, 4 Drawing Sheets

STRONGER CATALYST USING SELECTIVE WASHCOAT LOCATION

TECHNICAL FIELD

The present invention relates to catalytic converter substrates and more particularly relates to a strengthened catalytic converter substrate and a method for preparing the substrate.

BACKGROUND OF THE INVENTION

A variety of ceramic and metal catalytic converter substrates are known. Commercially available ceramic catalytic converter substrates have thin walls (typically about 0.006 inch to about 0.008 inch) and shaped cells, such as round, square, or triangular shaped cells. The substrate is formed by extruding a green ceramic mixture through an extrusion die. The extruded plasticized material is then dried and fired to provide a hard, solid catalytic converter substrate. Any ceramic material having suitable thermal, shock resistance, and melting temperature characteristics, such as cordierite, can be used. A washcoat is applied to the fired substrate, and catalyst solutions are impregnated into the washcoat. To prepare the catalytic converter, the catalyst-coated substrate is clamped into a suitable catalytic converter housing with a mat (which may have an expanding component) or other resilient retention material compressed between the substrate and the housing.

The catalyst washcoat is of a known type that, upon reaching a light-off temperature (i.e., effective catalytic operating temperature) stimulates reactions between constituents in exhaust gas flowing through the substrate cells to reduce the presence of undesirable species within the exhaust gas. In vehicle applications, hot engine exhaust gas flowing through the substrate raises the catalyst temperature to achieve light-off temperature. In the time period before any part of the substrate reaches light-off temperature, the catalytic converter is not operational to stimulate the reduction of undesirable species in the exhaust gas and those undesirable species escape from the tailpipe into the environment. This occurs, for example, when an engine is started from a "cold-start," i.e., when the engine has not been running in a while and the catalyst temperature at engine start-up is substantially that of the surrounding environment.

Accelerated catalyst heating is desirable and is particularly important for meeting increasingly stringent state and federal government vehicle emissions standards, such as the SULEV (Super Ultra Low Emission Vehicle) emissions standards proposed for 2004 introduction in California. For example, in normal, light load, summer operating conditions represented by the U.S. FTP (United States Federal Test Procedure), a vehicle developed and certified to the SULEV level emits extraordinarily low emissions comparable to an electric vehicle (including power plant emissions) and reactive hydrocarbon emissions modestly higher than an electric vehicle.

The time it takes for the substrate to reach light-off temperature depends, in part, upon the thermal mass of the substrate. A substrate with a lower thermal mass is heated to operational temperature quicker than a substrate with a higher thermal mass. One method of reducing the thermal mass of a substrate is to reduce the thickness of the substrate walls. However, ultra-thin walled substrates have very low strength. When the cell walls are too thin, the substrate will not be robust to assembly processes. Further, when the cell walls are too thin, the substrate will lack sufficient structural strength to survive in its operating environment. For example, catalytic converters are exposed to continual mechanical stresses, namely vibrations (particularly when used in automobiles), as well as thermal expansion and contraction (from constantly changing operating conditions, especially stop and go operation).

There is a need in the art for an improved catalytic converter substrate and method for preparing the same. Particularly, there is a need in the art for an improved catalytic converter substrate and method providing low thermal mass for fast light-off in combination with sufficient structural integrity to survive fabrication and assembly processes and to remain intact in harsh automotive environments over its intended service life.

SUMMARY OF THE INVENTION

The present invention provides a strengthened catalytic converter substrate and a method for preparing the substrate using controlled, selective washcoat application to maximize the structural integrity of the thin-walled substrate. The catalytic converter substrate comprises a substrate having cells defined by thin perimeter walls and thin interior walls, and a catalyst washcoat selectively disposed on the substrate so as to maximize substrate strength in those areas requiring the greatest amount of structural integrity.

The present invention employing selective washcoat application provides the advantage of lower substrate cost as compared to substrates that are strengthened with thicker walls or thicker applied skins. The present invention further provides the advantage of a more robust product design and reduces the amount of fallout due to cracked catalyst.

The present invention provides the further advantage of reduced processing costs. For example, since there is a high degree of die wear when extruding material such as cordierite, it is desirable to reuse dies for smaller cross-section parts as the outer cells wear out. This is not readily accomplished when wall thickness is different in outer cells versus inner cells. The present invention reduces the need for new extrusion dies by providing added strength to the catalyst where it is needed (e.g., in perimeter cells) without the need for differential wall thickness.

The present method includes using known coating methods including use of a mask for selectively disposing the washcoat. This provides a further advantage in that tooling costs for washcoat masking are significantly less than the costs of providing substrate walls having different wall thicknesses.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures:

FIG. 1A shows the deformation response, based on computer modeling, of a thin-walled substrate having a uniform washcoat distribution.

FIG. 1B is an enlargement of FIG. 1A

FIG. 1C shows the computer modeled tensile strain distribution of the substrate of FIG. 1A.

FIG. 2A shows the deformation response, based on computer modeling, of a substrate having selective washcoat distribution in perimeter cell areas in accordance with an embodiment of the present invention.

FIG. 2B is an enlargement of FIG. 2A.

FIG. 2C shows the computer modeled tensile strain distribution of the substrate of FIG. 2A.

DESCRIPTION OF THE PREFERRED EMBODIMENT

Figure 1:
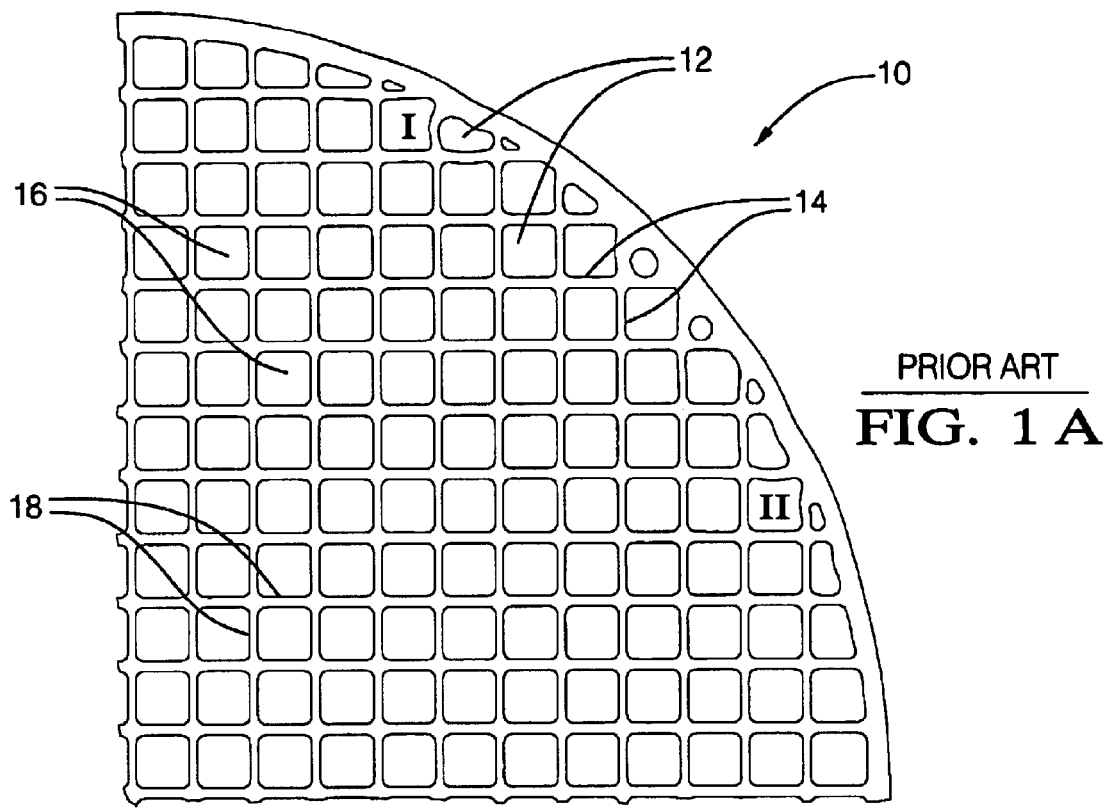
FIGS. 1A–1C show a partial cross-section of a thin-walled substrate having a substantially uniform washcoat distribution (non-invention).
Figure 1:
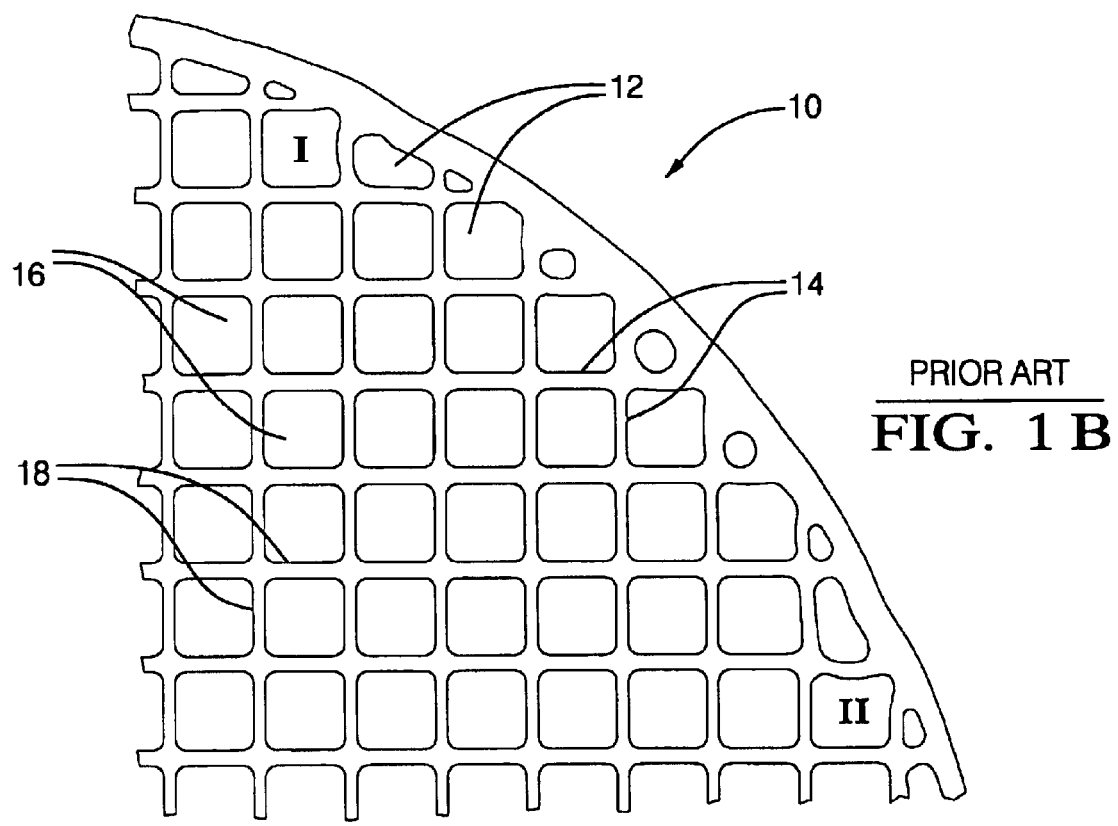
Figure 1C:
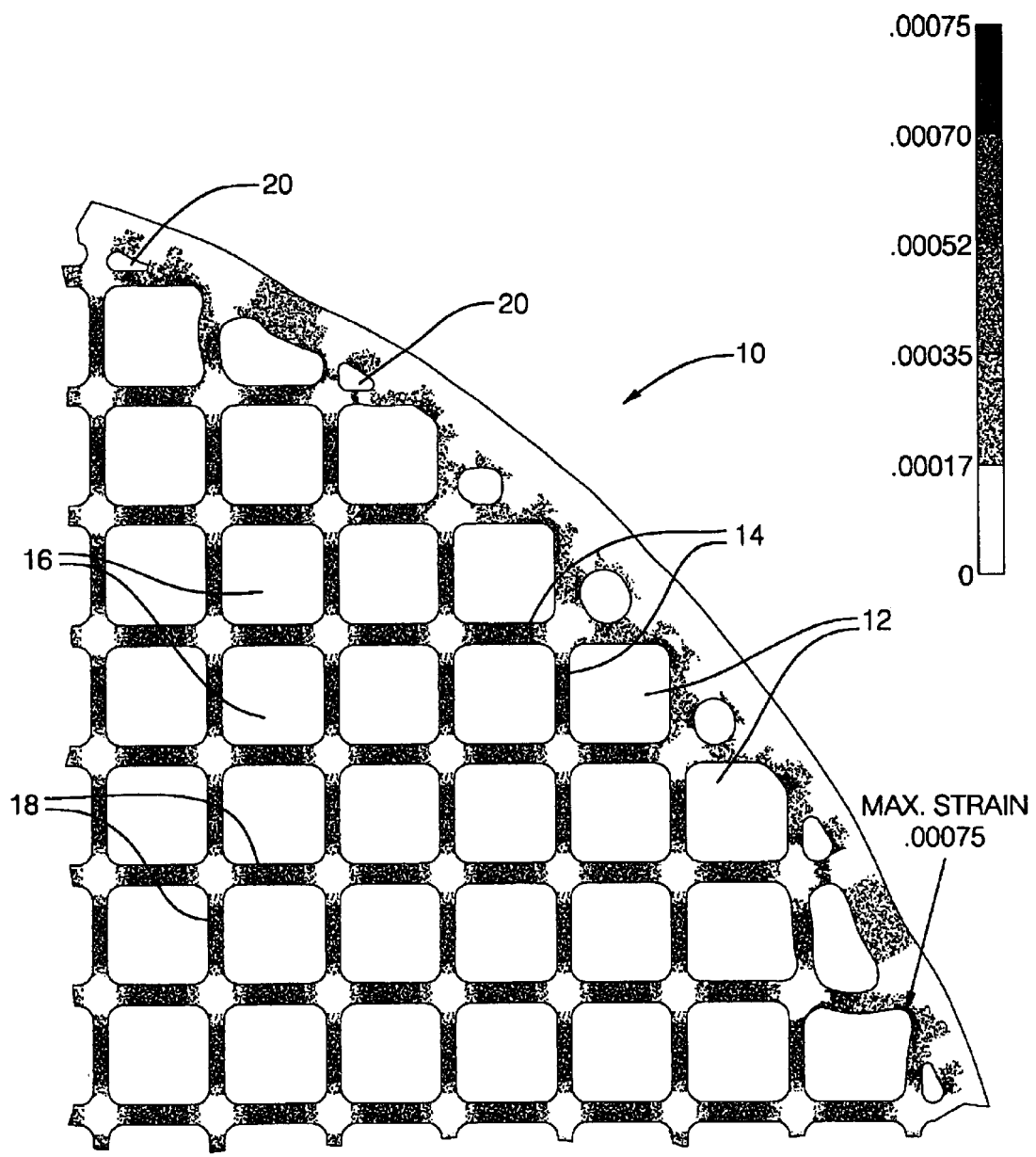
Figure 2:
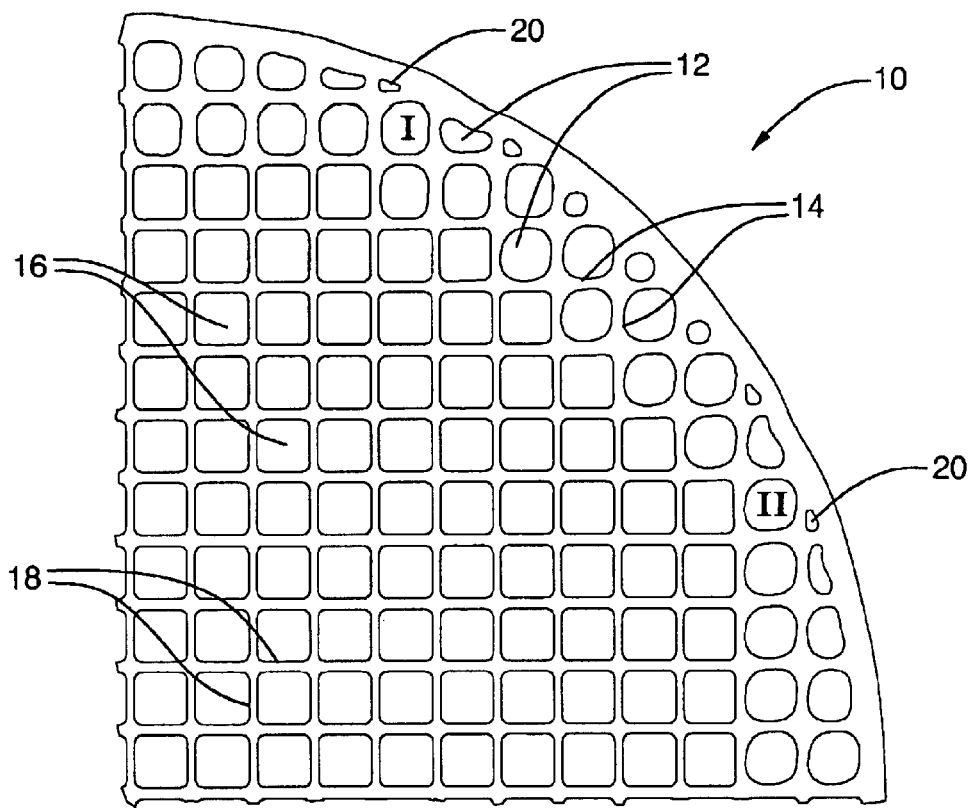
FIGS. 2A–2C show a partial cross-section of a thin-walled substrate prepared in accordance with an embodiment of the present invention having selective washcoat distribution.
Figure 2:
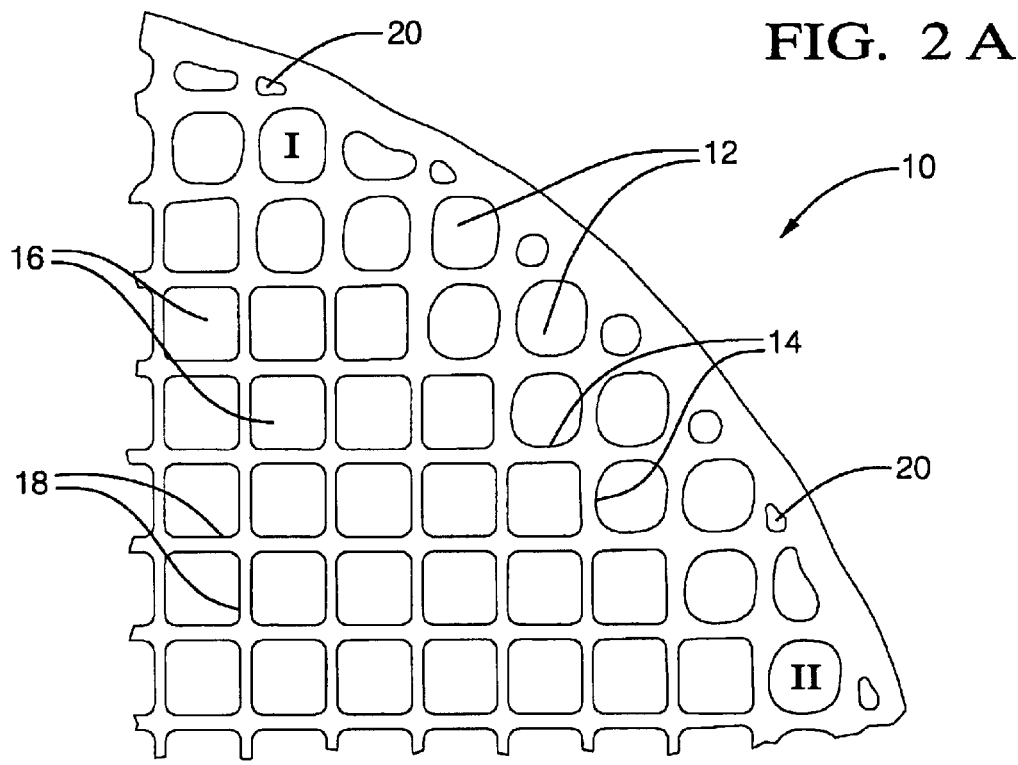
Figure 2:
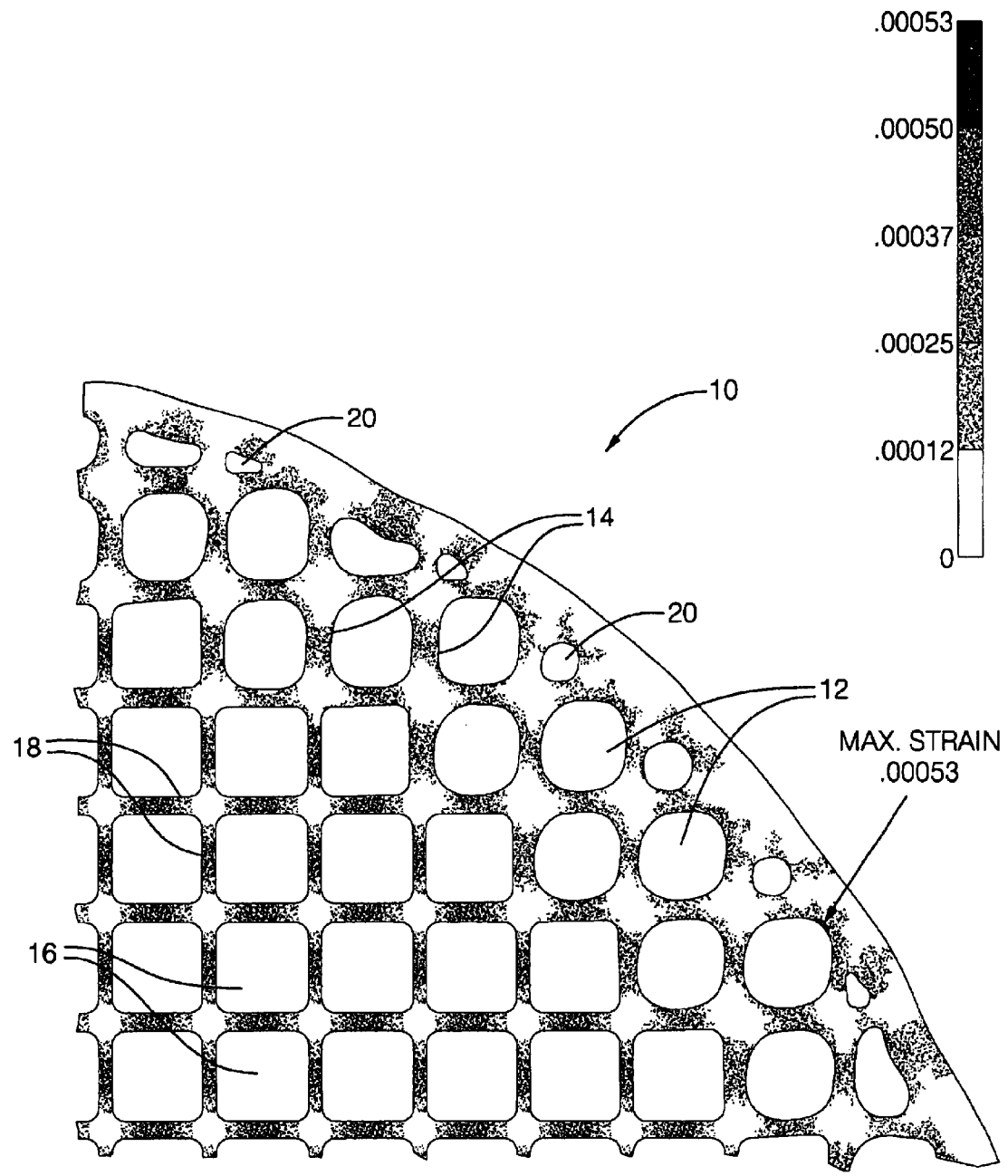

Turning now to the FIGURES, FIGS. 1A–2C show deformation and tensile strain responses to loads encountered during catalytic converter assembly based on computer modeling tests for thin-walled catalytic converter substrates having uniform washcoats (FIGS. 1A–1C, "non-invention") and substrates having selective waschcoats in accordance with the present invention (FIGS. 2A–2C, "invention").

In FIGS. 1A–1C (non-invention), a partial cross-section of a generally cylindrical thin-walled catalytic converter substrate 10 is shown. A uniform washcoat of about 1 mil is disposed on the substrate 10. FIGS. 2A–2C show a partial cross-section of a generally cylindrical thin-walled catalytic converter substrate 10 prepared in accordance with one possible embodiment of the present invention wherein the substrate 10 is selectively strengthened in the area of perimeter cells 12 by disposing a greater amount of waschcoat on substrate walls in the area of perimeter cells 12.

Computer modeling tests comparing load responses of substrates having uniform washcoat distribution (non-invention) compared with substrates having selective washcoat distribution according to the present invention shown in FIGS. 1A–2C were carried out using ABAQUS™ software commercially available from Hibbitt, Karlson & Sorensen, Inc. All simulated substrates were assigned uniform thin walls of about 3.5 mils (about 0.0035 inches or about 0.089 millimeters) in thickness and comprised about 600 cells per square inch (about 93 cells per square centimeter).

FIGS. 1A and 1B show the deformation response and FIG. 1C shows tensile strain of uniformly coated thin-walled substrate 10. The substrate 10 comprises perimeter cells 12 defined by thin perimeter walls 14 and interior cells 16 defined by thin interior walls 18. Thin perimeter walls 14 and thin interior walls 16 comprise ultra-thin walls of substantially identical wall thickness of about 3.5 mils (about 0.0035 inches or about 0.089 millimeters).

Turning to FIGS. 2A–2C, a partial cross-section of a substantially cylindrical thin-walled catalytic converter substrate 10 having selectively disposed washcoat in accordance with the present invention comprises perimeter cells 12 defined by thin perimeter walls 14 and interior cells 16 defined by thin interior walls 18. In the embodiment shown in FIGS. 2A–2C, thin perimeter walls 14 and thin interior walls 18 comprise ultra-thin walls of substantially identical wall thickness of about 3.5 mils (about 0.0035 inches or about 0.089 millimeters). While substrate wall thickness may be any thickness desired, typically, both thin perimeter walls 14 and thin interior walls 18 of the present substrate 10 comprise a substantially uniform wall thickness of about 0.109 millimeters to less than about 0.064 millimeters.

Substrate 10 is typically cylindrical, although substrates in accordance with the present invention may comprise any shape. Cells may be any shaped desired, including round, square, or triangular shaped cells.

In accordance with the present strengthened substrate and method, a catalyst washcoat is selectively disposed on the substrate 10 so as to maximize substrate strength in those areas requiring the greatest amount of structural integrity. Preferably, the washcoat is selectively disposed on the substrate walls so as to maximize substrate strength in the area of the perimeter cells 12. While perimeter walls 14 have the same wall thickness as interior walls 18, the perimeter walls 14 in FIGS. 2A–2C appear thicker than the interior walls 18 due to the greater amount of washcoat applied to the perimeter walls 14. As substrate walls are thinned, washcoat contribution to catalyst strength increases. On ultra-thin walled substrates having wall thicknesses of less than about 0.089 millimeters, washcoat accounts for about 100% to about 200% increase in isostatic strength. By increasing the amount of washcoat in perimeter cells 12, catalyst strength is tailored to meet the demands of various converter assembly processes and end-use environments. As we strengthen the catalyst with selective washcoat application, a portion of the outermost perimeter cells, such as, for example, partial perimeter cells 20, may become substantially completely plugged by the washcoat.

In a preferred embodiment, the washcoat disposed on wall surfaces in perimeter cells 12 is provided at a thickness of about 0.043 to about 0.153 millimeters and the washcoat disposed on wall surfaces in interior cells 16 is provided at a thickness of about 0.014 to about 0.051 millimeters.

The present method for preparing selectively strengthened catalytic converter substrates 10 includes preparing a substrate 10 having perimeter cells 12 and interior cells 16 defined by thin perimeter walls 14 and thin interior walls 18; and selectively disposing a catalyst washcoat so as to maximize substrate strength in areas requiring the greatest amount of structural integrity. In a preferred embodiment, the method comprises selectively disposing the washcoat so as to maximize substrate strength in the area of the perimeter cells 12.

Numerous methods are known for applying catalytically active materials to the surfaces of flow channels such as catalytic converter cells. The present method comprises using known processes or a combination of processes for selectively disposing the catalyst washcoat on the substrate 10. For example, vitreous processes may be employed to increase washcoat deposition selectively. Alternately, masking of regions comprising interior cells 16 and multiple coating passes may be used to achieve a higher solids content in perimeter cells 12. In another embodiment, one or a combination of variable airflow processes may be employed to selectively apply the washcoat by varying the air pressure applied to the substrate surface. For example, a high pressure air (e.g., air knife) coating process may be employed to selectively apply the washcoat from the upstream end of the substrate 10. The air knife may be used alone or in combination with a vacuum applied at the downstream end of the substrate 10.

Returning to FIGS. 1A–1C, FIGS. 1A–1C show the effect (based on the above-described computer modeling) of typical converter assembly forces on a (non-invention) thin-walled substrate having a uniformly distributed washcoat. FIG. 1A shows (100 times enlargement) the deformation experienced by a uniformly coated thin wall substrate having a uniform waschcoat of about 1 mil in response to about 1000 psi skin pressure. FIG. 1B provides an enlargement of FIG. 1A. Looking, for example, to numbered cells 1 and 2, the deformation experienced under typical loads of about 1000 psi skin pressure is shown. The deforming of the perimeter cell walls under load contributes to the overall weakening of the substrate 10 and shortening of the substrate 10 service life.

FIG. 1C shows the tensile strain distribution of the thin-walled substrate of FIG. 1 in response to the same load of about 1000 psi skin pressure. It can be seen that the uniform washcoat thin-walled substrate experiences a tensile strain (defined as the change in length per unit original length) of about 0.00075 under about 1000 psi skin pressure.

Returning to FIGS. 2A–2C, FIGS. 2A–2C show the effect (based on the above-described computer modeling) of typical converter assembly forces of about 1000 psi on a selectively strengthened thin-walled substrate 10 prepared in accordance with the present invention having selectively distributed washcoat (in this embodiment, increased washcoat distribution in perimeter).

FIG. 2A shows (100 times enlargement) the deformation experienced in response to about 1000 psi skin pressure for the strengthened thin wall substrate 10 having a washcoat thickness of about 1 mil (about 0.001 inch; about 0.0254 millimeter) at interior cells 16 and a washcoat thickness of about 2 mils (about 0.002 inch; about 0.0508 millimeter) at perimeter cells 12. FIG. 2B provides an enlargement of the view shown in FIG. 2A. Substrate 10 prepared with selected washcoat distribution provides enhanced cell strength (i.e., less deformation). This is seen, for example, by comparing numbered cells 1 and 2 of FIGS. 2A and 2B, which remain substantially intact under 1000 psi skin pressure, with numbered cells 1 and 2 of FIGS. 1A and 1B (non-invention), which show significant deformation under the same load.

FIG. 2C shows the tensile strain distribution of the substrate of FIG. 2A experienced under the 1000 psi load. Comparing the FIGS. 1C (non-invention) and 2C (invention), a reduction in tensile strain of about 29% is achieved with the present invention. That is, the tensile strain in the cell wall is reduced from about 0.00075 in the non-invention substrate shown in FIG. 1C to 0.00053 in the substrate prepared in accordance with the invention shown in FIG. 2C.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A catalytic converter substrate comprising:
   a substrate having perimeter cells defined by thin perimeter walls and interior cells defined by thin interior walls; and
   a catalyst washcoat disposed on said substrate, wherein the thickness of the catalyst washcoat is greater on said thin perimeter walls than on said thin interior walls
   wherein said washcoat disposed on said perimeter walls has a thickness of about 0.043 millimeters to about 0.153 millimeters and said washcoat disposed on said interior walls has a thickness of about 0.014 millimeters to about 0.051 millimeters.

2. The catalytic converter substrate of claim 1, wherein said washcoat is disposed on said substrate so as to maximize substrate strength in the area of said perimeter walls.

3. The catalytic converter of claim 1, wherein said thin perimeter walls and said thin interior walls comprise a wall thickness of about 0.109 millimeters to less than about 0.064 millimeters.

4. A method for preparing a catalytic converter substrate comprising:
   preparing a substrate having perimeter cells defined by thin perimeter walls and interior cells defined by thin interior walls; and
   applying a catalyst washcoat on the thin perimeter walls and the thin interior walls such that the thickness of the catalyst washcoat is greater on said thin perimeter walls than on said thin interior walls, said washcoat being applied on said perimeter walls at a thickness of 0.043 millimeters to about 0.153 millimeters; and on said interior walls at a thickness of about 0.014 millimeters to about 0.051 millimeters.

5. The method of claim 4, comprising:
   applying said washcoat so as to maximize substrate strength in the area of said perimeter walls.

6. The method of claim 4, wherein said thin perimeter walls and said thin interior walls comprise a wall thickness of about 0.109 millimeters to less than about 0.064 millimeters.

7. The method of claim 5, wherein said selectively disposing comprises employing vitreous coating processes, masking, or a combination thereof.

* * * * *